United States Patent [19]

Musick

[11] 4,016,034
[45] Apr. 5, 1977

[54] NUCLEAR REACTOR CONTROL OVERRIDE SYSTEM AND METHOD

[75] Inventor: Charles Ronald Musick, Vernon, Conn.

[73] Assignee: Combustion Engineering, Inc., Windsor, Conn.

[22] Filed: July 19, 1974

[21] Appl. No.: 490,158

[52] U.S. Cl. .................. 176/22; 176/19 EC; 176/24
[51] Int. Cl.² .................. G21C 7/06; G21C 17/00
[58] Field of Search .......... 176/19 EC, 19 R, 20 R, 176/22, 24

[56] References Cited

UNITED STATES PATENTS

| | | | |
|---|---|---|---|
| 3,202,804 | 8/1965 | Schlein | 176/24 |
| 3,356,577 | 12/1967 | Fishman | 176/20 R |
| 3,423,285 | 1/1969 | Curry et al. | 176/24 |
| 3,565,760 | 2/1971 | Parkos et al. | 176/24 |
| 3,656,074 | 4/1972 | Bevilacqua et al. | 176/19 R |
| 3,706,921 | 12/1972 | Rosen | 176/22 |
| 3,752,735 | 8/1973 | Musick et al. | 176/24 |
| 3,791,922 | 2/1974 | Musick | 176/19 EC |
| 3,899,727 | 8/1975 | Thayer | 176/22 |

*Primary Examiner*—Samuel W. Engle
*Assistant Examiner*—S. A. Cangialosi
*Attorney, Agent, or Firm*—Stephen L. Borst; Eldon H. Luther

[57] ABSTRACT

A system is provided which prevents the operation of a nuclear reactor in a region of a prohibited reactor power distribution. The method of operation includes inhibiting the insertion of control rods into the reactor on the basis of a power dependent control rod insertion limit and further overriding the control of the reactor by rapidly reducing reactor power when reactor power increases to a reactor power which exceeds by a predetermined margin the limit set by the power dependent control rod insertion limit.

14 Claims, 2 Drawing Figures

NUCLEAR REACTOR CONTROL OVERRIDE SYSTEM AND METHOD

BACKGROUND OF THE INVENTION

1. Field of the Invention

This invention relates to safety systems for nuclear reactors. More specifically, this invention is directed to the override of nuclear reactor control with the purpose of insuring that minimum conditions are present at all times in order to insure the adequate operation of the nuclear reactor safety system.

2. Description of the Prior Art

The theory and operation of nuclear reactors is now well known. Quite briefly, a fissionable atom such as $U^{233}$, $U^{235}$, or $Pu^{239}$ absorbs the neutron in its nucleus and undergoes a nuclear fission. This produces, on the average, two fission products of lower atomic weight and great kinetic energy, and several high energy fission neutrons. The kinetic energy of the fission products is quickly dissipated as heat in the nuclear fuel. A small fraction of the fission products consists of highly radioactive elements. In order to prevent the release of these radioactive fission products from the reactor fuel, the fuel is clad or enclosed in sealed cans. Accordingly, the operation of the nuclear reactor is limited by the temperature which the fuel element cladding materials will tolerate without failure. In order to adequately protect the reactor core against excessive temperatures is it necessary to provide a protection system which monitors various parameters of the reactor and which automatically takes control of the reactor and shuts the reactor down when dangerous conditions are approached. The critical parameters which have an effect on core temperatures include coolant temperature, coolant pressure, total reactor power, local power and coolant flow rates.

It is conventional in the art of reactor control to continuously monitor each of these parameters. The continuously monitored parametric values are then compared to independently pre-established high and low limits. One such prior art protection system which monitors only power is disclosed in U.S. Pat. No. 3,565,760 entitled "Nuclear Reactor Power Monitor System." This prior art patent proposes a way to monitor the bulk thermal power level and to scram the reactor when the bulk thermal power level or local power level is unacceptably high. Such reactor protection systems, as the one described in the above mentioned patent, limit themselves to the separate consideration of each parameter rather than addressing themselves to the plurality of parameters which are functionally interrelated to determine a core operating limit. Such prior art reactor protection systems which monitor only one of the multiplicity of pertinent parameters must or should be supplemented by a multiplicity of independent protection systems which independently monitor the other parameters. Thus, it is a characteristic of such prior art reactor protection systems to provide a multiplicity of separate systems that independently establish operating envelopes for each of the parameters but ignore the functional interrelationship between the parameters. The nuclear reactor power systems which are operated with such independent protection systems are subject to economic penalties imposed by unduly conservative safety system designs, since they are incapable of taking advantage of the functional interrelationship of the pertinent parameters.

In order to avoid the conservatism inherent in the parameter by parameter approach of these typical prior art protection systems, other protection systems have been developed to address themselves, at least partially, to the functional interdependence of the parameters of interest. Thus, a multiple parameter thermal margin trip system is disclosed in U.S. Pat. No. 3,791,922 issued on Feb. 12, 1974 and assigned to the assignee of the present invention. This thermal margin protection system utilizes the functional interdependence of the parameters of reactor coolant temperature, reactor coolant pressure and reactor power. In order for the multiple parameter protection systems to provide the protection function intended by their designers, there must be provided at least one additional independent means to assure that the parameters not addressed by the multiple parameter systems are maintained at either constant values or within assumed envelopes of values. For example, one of the requirements is that the reactor power distribution by maintained within acceptable bounds.

It is well understood that control rod insertion, as well as other phenomena, has an effect on reactor power distribution. In designing the reactor and the reactor control systems, the reactor designers establish allowable control rod insertion patterns and degrees of insertion for each power level. It has become apparent that at lower power levels certain control rod insertion patterns and power distributions are permissible that are not permissible at higher power levels. Thus, a control system and method are required which permit certain control rod patterns and power levels at lower power but which do not permit the same patterns and insertions at higher levels. The required system is complicated by the fact that power is dependent on variables other than control rod insertion, such as xenon poison, boron concentration in the coolant, coolant density and coolant void fraction. Accordingly, the present invention is intended to provide a system and a method for helping to assure that the power distribution is maintained within acceptable bounds at all times.

SUMMARY OF THE INVENTION

An apparatus and process are provided for preventing the operation of a nuclear reactor in a prohibited power configuration by limiting the power distributions which may be created in the core of the reactor. It has been found that greater degrees of control rod insertion into the reactor core are permissible at lower bulk powers than at higher bulk powers. Therefore, in order to insure the existance of an acceptable power distribution, as bulk power is increased, the degree of control rod insertion must be decreased. Accordingly, a power dependent control rod insertion limit curve can be generated from an indication of reactor power. Control rod insertion is then inhibited on the basis of the power dependent control rod insertion limit curve.

However, due to the parametric dependence of reactor power on variables other than control rod positions, such as coolant pressure, coolant temperature, coolant boron concentration, xenon poison concentration, and other variables, the reactor bulk power may be increased without a corresponding withdrawal of control rods from the reactor core. If such a power increase were to occur without corresponding control rod withdrawal, a power distribution which was permissible at a lower power, would be carried up in power into a prohibited region where the power distribution is no longer permissible. Thus, the invention further provides a scram system for preventing positive excursions in power that can occur without an accompanying control rod withdrawal. The scram system generates a setpoint which is displaced from the power by a predetermined excursion margin. The setpoint is allowed to decrease with corresponding decrease in power, but it is not permitted to increase with corresponding increase in power. The setpoint can only be increased through independent operator action which is initiated only after the operator has determined that the control rods are above the actual power dependent control rod insertion limit curve. Thus, with any given power, a corresponding control rod insertion limit is provided and an excursion margin is maintained so that an increase in reactor power without corresponding control rod withdrawal results in a rapid power reduction or scram when the excursion margin is exceeded. In this manner, the invention helps prevent the operation of the reactor with a prohibited power configuration.

The present invention may be better understood and its numerous objects and advantages will become apparent to those skilled in the art by reference to the accompanying drawings in which.

DESCRIPTION OF THE PREFERRED EMBODIMENT

For the sake of simplicity of expression the terminology "power", "reactor power", or "power level" will hereinafter be used in place of the term "bulk power". However, it should be understood that bulk power or average power is always intended unless the word "power" is otherwise modified.

Figure 2:
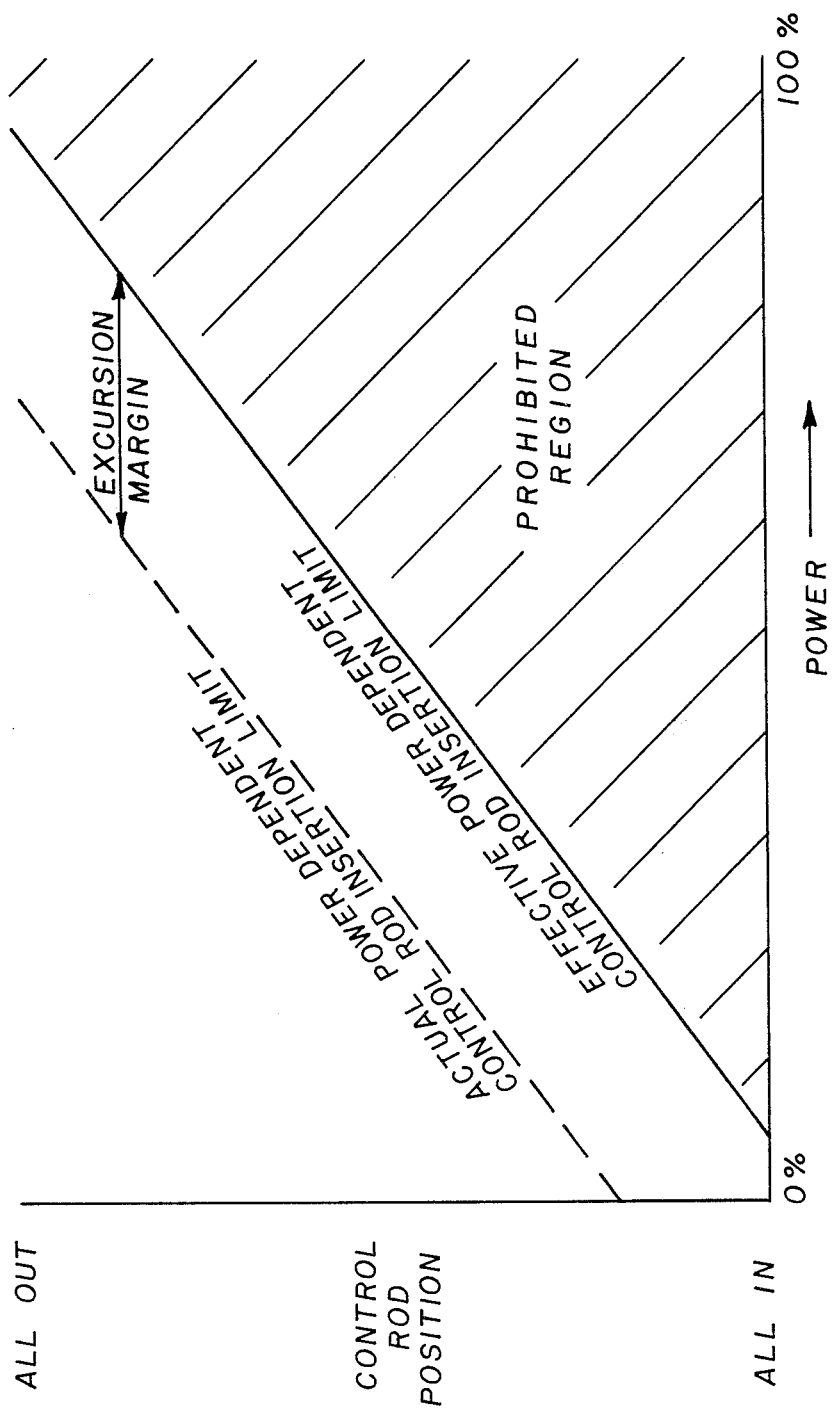
FIG. 2 is a graph of control rod position versus bulk power showing the power dependent control rod insertion limit.

Looking first at FIG. 2 it can be seen that reactor power has been plotted on the x-axis and control rod position has been plotted on the y-axis. The shaded portion of the plot indicates a region of prohibited power configurations in which the corresponding reactor power and control rod position result in an unacceptable power distribution. The unshaded portion of the graph on the other hand illustrates combinations of reactor power and control rod insertions which are acceptable and result in an acceptable reactor power distribution. The importance of the two regions in the graph of FIG. 2 is best understood when it is realized that the primary reactor protection system can operate adequately to protect the reactor only if the reactor is not allowed to be operated with a control rod insertion and a corresponding reactor power which places a point in the prohibited region of the graph. For the purposes of this description and the following claims, "prohibited power configuration" is defined to be a control rod insertion which creates a power distribution at a particular power level which is outside of the envelope of values assumed by the reactor protection system. Such non-assumed prohibited power configurations render the reactor protection system incapable of adequately protecting the reactor in the event of an anticipated operational occurrence. Thus, it is essential that the "prohibited power configurations" be excluded from the modes of operation of the nuclear reactor.

Accordingly, the present invention discloses systems and a method of operation for a nuclear reactor which assures that the reactor will never be operated with a combination of control rod insertion and power that brings the reactor into the shaded portion of the graph. The present invention proposes a system comprising two subsystems which operate hand in hand to prevent the violation of the prohibited region of FIG. 2. In order to implement the first subsystem, the reactor physicists and engineers calculate, for the particular reactor, an effective power dependent control rod insertion limit which is the boundary between the prohibited and the permissible regions of FIG. 2 and represents the maximum permissible control rod insertion for a given reactor power level. The effective power dependent control rod insertion limit is then used to prevent control rod insertion at a given power which would cause the reactor configuration to go below the effective power dependent control rod insertion limit boundary.

The effective power dependent control rod insertion limit by itself is incapable of preventing the combination of control rod insertion and reactor power from violating the prohibited region. The reason for this fact is that in addition to control of reactor power by control rod insertion or withdrawal, the power of the reactor may be varied by conditions other than control rod position. For example, the boron concentration in the reactor coolant can be changed to either increase or decrease reactor power. Other variables which may be varied to effect the reactor power include power distribution changes, temperature changes, xenon burnout, coolant void concentration and possibly coolant pH effects. Thus, an ancillary subsystem is required to prevent an increase in power that is not accompanied by a control rod withdrawal. While it is necessary to have a system that prevents reactor power increase without corresponding control rod withdrawal, it is not desirable to have a system that is not flexible enough to accommodate minor power fluctuations that occur during the normal every day operation of the reactor. Therefore, it is desirable to build into the subsystem a margin which allows power fluctuations within a certain limit but prohibits power fluctuation which exceed an excursion margin. Accordingly, the effective power dependent control rod insertion limit must be backed off as illustrated in FIG. 2 to a new insertion limit by an amount equivalent to a power excursion margin. This "backed off power dependent control rod insertion limit" is illustrated by the dotted line in FIG. 2 and is called the actual power dependent control rod insertion limit to distinguish it from the effective power dependent control rod insertion limit. This invention provides a system which inhibits control rod insertion on the basis of the actual power dependent control rod insertion limit and allows power fluctuations to a degree controlled by the power excursion margin. In actual operation the control rods are allowed to be inserted until, at a given power, the actual power dependent control rod insertion limit is reached. At the same time reactor power is allowed to fluctuate within a limit set by the power excursion margin. If, however, the power were to increase to such a degree that it exceeds the power excursion margin, such an increase brings the reactor into the prohibited region of FIG. 2 and appropriate action is immediately taken. This appropriate action is a immediate reactor scram. As can be seen from an examination of FIG. 2, it is necessary to have a system which is capable of generating a variable overpower scram setpoint which has a locus corresponding to the effective power dependent control rod insertion limit.

Figure 1:
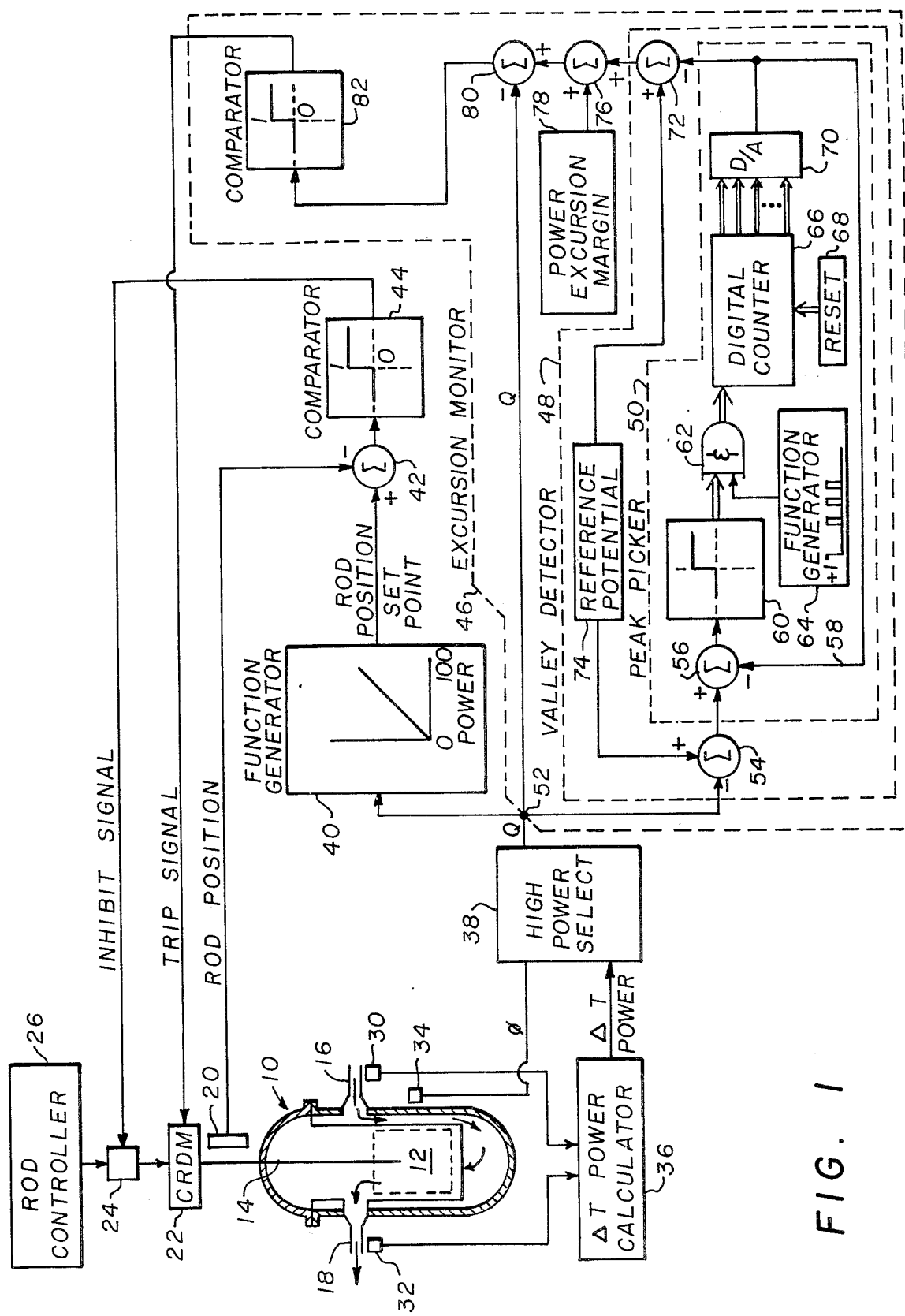
FIG. 1 is a functional diagram of the reactor control system.

Looking now at FIG. 1, the system which accomplishes the above described control actions is functionally set forth. A nuclear reactor is illustrated at 10 and has a core 12 through which coolant flows and into and out of which a control rod 14 is driven by a control rod drive mechanism 22. The coolant flows into the reactor through pipe 16, is directed to the bottom of the reactor vessel 10 and up through the reactor core 12 and out through pipe 18. Resistance temperature detectors 30 and 32 monitor the temperature of the coolant at its cold leg position and its hot leg position respectively. These temperature signals are sent to a calculator 36 which calculates reactor power on the basis of the rise in temperature of the coolant between the cold leg and the hot leg. The power calculation of calculator 36 and the apparatus therefore is disclosed in the prior art in U.S. Pat. No. 3,752,735 entitled "Instrumentation For Nuclear Reactor Core Power Measurements." Concurrently a neutron flux detector 34 positioned external to and adjacent to the reactor core 12 and pressure vessel 10 generates a signal commensurate with flux power. The two signals, flux power and temperature power ($\Delta t$) are delivered to a high power selector 38 which selects the larger of the two signals. This power signal (Q) is a signal which is proportional to the reactor power. The power signal Q is delivered to junction 52.

From junction 52 the power signal proceeds to a function generator 40 which is adjusted to incorporate the actual power dependent control rod insertion limit. Function generator 40 is a conventional commercially available piece of equipment and the particular construction does not form a part of this invention. The function generator responds to the power input signal and generates a rod position setpoint according to the actual power dependent control rod insertion limit as illustrated in FIG. 2. A signal indicative of the rod position setpoint generated by the function generator 40 is then delivered to a summing unit 42. A signal indicative of actual rod position is also delivered to summing unit 42. The actual rod position signal is generated by a rod position detector 20 which may be a device similar to the rod position indicating apparatus as disclosed in U.S. Pat. No. 3,656,074 entitled "Control Rod Position Transmitter." The rod position signal and the rod position setpoint signal are then summed and compared by summing unit 42 and comparator 44. Thus, in a conventional and well known manner the output signal which is generated by comparator 44 is a digital zero when the comparison of the rod position signal from detector 20 and the rod position setpoint from function generator 40 indicates a point above the actual power dependent control rod insertion limits, and the output signal of comparator 44 is a digital one when a like comparison indicates a point below the actual power dependent control rod insertion limit. The digital one signal is then delivered to relay or gate 24 which opens the circuit between the rod controller 26 and the control rod drive mechanism 22 thereby inhibiting any further insertion of the control rod 14.

It should be recognized that the above description has been described only in relation to a single control rod 14 and a single control rod drive mechanism 22 with a single control rod controller 26. It should be understood, however, that the nuclear reactor 10 is ordinarily controlled by a multiplicity of control rods which are grouped into control rod banks which have not been shown for the sake of simplicity. It is conventional to control a nuclear reactor by inserting various banks and groups of banks into the core in an insertion sequence. A typical rod sequence management apparatus is disclosed in U.S. Pat. No. 3,391,058 issued to J. Gilbert on July 2, 1968. It would be obvious to a person skilled in the art how to generate a control rod position signal which is uniquely indicative of a particular point in the control rod insertion sequence. It is also obvious to a person skilled in the art that the actual power dependent control rod insertion limit includes a locus of values which are each indicative of a unique value for a certain degree of collective control rod insertion according to the insertion sequence rather than being comprised of unique values which are indicative of the unique positions of one single rod.

To complete the protection function of the present invention an excursion monitor 46 which operates hand in hand with the above described control rod insertion inhibit is next described. The function of the excursion monitor 46 is to monitor the power and to allow the power to fluctuate within certain limits but to trip the reactor when the power fluctuations exceed those limits. Thus, a trip signal is sent to the control rod mechanisms 22 when the power fluctuates to exceed its allowable excursion margin. When the trip signal is delivered to the control rod drive mechanism 22 the control rods are caused to fall into the core thereby causing a rapid reactor power reduction.

As described above, in order for the excursion monitor to operate successfully it must generate a variable excursion setpoint since the initial or reference power from which the power excursion deviates is also variable. Therefore, the equipment described as the excursion monitor 46 is designed to automatically track the power downward and to automatically hold on the last minimum value of power and to trip the reactor when the power increases to exceed the last minimum value of power by more than the allowed excursion margin. In addition the reference power, which is held by the system, is allowed to increase only upon independent authorization such as an authorization originating from a human reactor operator. The reference increase upon independent authorization capability allows the described system to be continually in operation even during start up of the reactor when the power is brought from 0% of power to 100% power. This feature also allows power maneuvers in which the power of the reactor is intentionally lowered and raised in accordance with some predetermined plan where the reactor operator is able to verify that the increase in power is legitimate.

From junction 52 the power signal is sent to a valley detector 48 which tracks and holds the minimum value of power. The valley detector 48 is comprised of a peak picker 50 which has been transformed into a valley detector by the appropriate comparison of the input and output signals of the peak picker 50 to a reference potential. This reference potential is supplied by a well-known means 74 which may typically include a power supply and a potentiometer. In FIG. 1 the power signal Q is subtracted in subtractor 54 from the reference potential delivered from module 74. This subtraction inverts the power signal so that the peak picker can select peaks as it is designed to do with the peaks actually being inverted valleys. The output signal of subtractor 54 is delivered to the peak picker 50 which consists of a subtractor 56 which subtracts the peak picker's output signal delivered by line 58 from the peak picker's input signal. The resultant difference signal is then delivered to signal generator 60 which generates a digital one signal when the incoming signal exceeds the output signal and a digital zero when the output signal exceeds the input signal. The digital one signal from signal generator 60 is then delivered to an "and" gate 62 which also receives an input signal from function generator 64. The function generator 64 generates a pulsed signal, which has been schematically illustrated in FIG. 1, so that the "and" gate passes a pulsed signal when the "and" gate is receiving the digital one signal from the signal generator 60. The passed signal from "and" gate 62 is delivered to a digital counter 66. The count registered on the digital counter 66 is then converted via digital/analogue convertor 70 into an analogue signal commensurate with the magnitude of the recorded count. At this point a reset signal can be injected into the peak picker from reset button 68. The effect of the reset button 68 is to drive the count on the digital counter 66 to all zeros. As a result, the output of the digital/analogue convertor 70 is zero and the comparison back at subtractor 56 is very positive. Accordingly, a digital one signal is rapidly passed by signal generator 60, "and" gate 62, digital counter 66 and digital analogue converter 70 until the output signal from digital analogue/convertor 70 reaches the initial input signal being delivered to subtractor 56. In this manner, the value which is tracked and held by peak picker 50 is allowed to rapidly reset to the magnitude of the incoming signal. Ordinarily, without the depression of the reset button 68, the value tracked and held by peak picker 50 is not allowed to decrease automatically. This can be seen by the fact that when the output signal from digital/analogue convertor 70 delivered through line 58 is larger in magnitude than the input signal, the resultant signal of subtractor 56 is negative and the signals passed by the signal generator 60 is a digital zero. Consequently, "and" gate 62 does not pass a signal to the digital counter and the digital counter remains as its last highest value.

In order to convert the picked peaks back into valleys, the signal generated by digital/analogue convertor 70 is delivered to another subtractor 72 which subtracts the output signal of the peak picker 50 from the original reference potential from module 74. This signal shaping step converts the peaks into valleys and as a result the valley detector 48 tracks and holds the lowest value of the reactor power. To this lowest value is added an power excursion margin in summer 76. The source of the power excursion margin 78 is a conventional arrangement of power supply and potentiometer. It should be obvious to a person skilled in the art that the addition of the power excursion margin that is accomplished as illustrated in summer 76 could also be made anywhere between junction 52 and the position of the summer 76. The power signal from junction 52 is then subtracted in subtractor 80 from the sum signal emitted from summer 76. This different signal is then delivered to comparator 82 which generates a digital one trip signal when the power Q exceeds the sum signal commensurate with the sum of the last valley plus the power excursion margin. If the power does not exceed the sum signal then comparator 82 does not send a trip signal to the control rod drive mechanism 22.

With the aid of the excursion monitor, the power is tracked in a downward direction and held at its lowest value. To this tracked and held signal is then added a power excursion margin. The tracked and held signal plus the power excursion margin is then compared to the actual power, and when the actual power exceeds the power excursion margin the reactor is tripped thereby terminating the chain reaction in the core 12. As a consequence of the excursion margin system 46 in cooperation with the control rod inhibit system described above, the reactor power is effectively prevented from entering the prohibited region which lies in the shaded area of the graph below the effective power dependent control rod insertion limit of FIG. 2. The inhibit system permits power reduction by control rod insertion only within the region which lies above the actual power dependent control rod insertion limit. The excursion monitor 46 then takes over and prevents increases in reactor power without corresponding control rod movement which would carry the operating point from the allowable region above the effective power dependent control rod insertion limit into the prohibited region lying under the effective power dependent control rod insertion limit.

What is claimed is:

1. An apparatus for the prevention of fuel damage caused by prohibited power configurations in a nuclear reactor system having control rods by preventing the operation of the nuclear reactor with other than predetermined permissible control rod configurations for given values of bulk power, said permissible control rod configurations being such that local power does not exceed specified limits established to prevent fuel damage, wherein the apparatus comprising in combination:
   a. means for detecting the bulk power level of said nuclear reactor and for generating a signal proportional to bulk power;
   b. means for monitoring control rod position; and
   c. means responsive to said bulk power level detecting means and to said control rod position monitoring means, for determining whether a permissible control rod configuration exists for a given bulk power and for inserting sufficient negative reactivity to reduce the bulk power of said reactor to prevent said local power from exceeding said specified limits established to prevent fuel damage when a permissible control rod configuration does not exist for a given bulk power.

2. The apparatus as recited in claim 1 for the prevention of fuel damage caused by prohibited power configurations in a nuclear reactor system having control rods, further including means responsive to said power level detecting means and to said control rod position monitoring means for inhibiting control rod insertion.

3. The apparatus as recited in claim 1 for the prevention of fuel damage caused by prohibited power configurations in a nuclear reactor system having control rods wherein said means for inserting sufficient negative reactivity to reduce the bulk power of said reactor includes:
   a. means responsive to said signal proportional to bulk power for generating a biased signal, said biased signal consisting of a first portion which represents said signal proportional to bulk power and which has been tracked and held at its last minimum value and a second portion which represents a power excursion margin; and b. means for comparing said biased signal to said signal proportional to bulk power and for inserting sufficient negative reactivity to reduce the bulk power of said nuclear reactor when said signal proportional to bulk power equals or exceeds said biased signal.

4. The apparatus for the prevention of fuel damage caused by a prohibited power configuration in a nuclear reactor having control rods as recited in claim 3, wherein said means for generating a biased signal includes:
   a. means for tracking and holding the last minimum value of an input signal; and
   b. means for adding a power excursion margin.

5. The apparatus as recited in claim 4 wherein said means for tracking and holding the last minimum value of an input signal includes:
   a. means for inverting said signal proportional to bulk power to generate an inverted signal;
   b. means responsive to said means for inverting said signal proportional to bulk power for picking and holding of the peaks of said inverted signal; and
   c. means for inverting said peaks into valleys so that the last minimum value of said input signal is tracked and held.

6. An apparatus as recited in claim 2, for the prevention of fuel damage caused by prohibited power configurations in a nuclear reactor system having control rods, said reactor being cooled by a coolant circulated therethrough wherein said means for detecting a the bulk power level of said nuclear reactor includes:
   a. means responsive to reactor coolant temperature rise for generating a signal indicative of bulk reactor power as a function of thermal energy added to the coolant;
   b. means responsive to reactor neutron flux for generating a signal indicative of bulk reactor power as a function of neutron flux; and
   c. means responsive to said signal indicative of bulk reactor power as a function of thermal energy added to the coolant and to said signal indicative of bulk reactor power as a function of neutron flux for selecting the signal commensurate with the highest reactor power level.

7. An apparatus for the prevention of fuel damage caused by prohibited power configurations in a nuclear reactor having control rods, as recited in claim 2, wherein said means for inhibiting control rod insertion includes:
   a. means responsive to said means for detecting the bulk power level of said nuclear reactor for generating a control rod position setpoint which varies as a function of said nuclear reactor bulk power;
   b. means responsive to said means for generating a control rod position setpoint and to said means for monitoring control rod position for comparing said control rod position and said control rod position setpoint; and
   c. means responsive to said comparison means for inhibiting said control rod insertion when said control rod position reaches said control rod position setpoint.

8. A process for the prevention of fuel damage in a critical nuclear reactor having control rods, wherein the process comprising the steps of:
   a. determining permissible control rod configurations for each value of bulk power, said permissible control rod configurations being such that local power does not exceed specified limits established to prevent fuel damage;
   b. determining from said permissible control rod configurations for each value of bulk power a power dependent control rod insertion limit;
   c. generating a signal indicative of bulk reactor power;
   d. generating a signal indicative of control rod position; and
   e. in response to said indication of bulk reactor power, said indication of control rod position, and said power dependent control rod insertion limit, inserting sufficient negative reactivity to prevent local reactor power from exceeding said specified limits established to prevent fuel damage.

9. The process of claim 8 wherein said step of determining a power dependent control rod insertion limit includes the steps of:
   a. determining a locus of points defined by a plurality of said control rod configurations for a plurality of values of bulk power, said locus of points constituting a curve designated the effective power dependent control rod insertion limit; b. determining a maximum permissible power excursion to determine an excursion margin; and
   c. subtracting said excursion margin from said effective power dependent control rod insertion limit to obtain a curve designated the actual power dependent control rod insertion limit.

10. The process of claim 9 further including the steps of:
    a. inhibiting control rod insertion when said actual power dependent control rod insertion limit is reached for a given bulk reactor power level; and
    b. when said bulk reactor power undergoes a power excursion in the increasing direction which exceeds said predetermined excursion margin, inserting sufficient negative reactivity to reduce bulk reactor power so that said excursion margin is no longer exceeded.

11. The process as recited in claim 10 wherein said step of inserting sufficient negative reactivity to reduce bulk reactor power includes the step of scramming the control rods into the reactor core.

12. The process as recited in claim 10 wherein said step of inserting sufficient negative reactivity to reduce bulk reactor power when said reactor power undergoes a power excursion in the increasing direction which exceeds a predetermined margin includes the steps of:
    a. generating a variable excursion setpoint by tracking and holding the minimum value of the sum of said bulk reactor power and said excursion margin;
    b. resetting said excursion setpoint to a value larger than said minimum value of the sum of said excursion margin and said bulk reactor power only on permission from an independent decision maker;
    c. comparing said bulk reactor power to said excursion setpoint; and
    d. inserting negative reactivity when said bulk reactor power exceeds said excursion setpoint.

13. The process as recited in claim 10 wherein the step of inhibiting control rod insertion when said actual power dependent insertion limit is reached includes the steps of:
    a. generating a control rod position setpoint from said signal indicative of said bulk reactor power and from said actual power dependent control rod insertion limit;

b. comparing said control rod position setpoint to said signal indicative of control rod position; and c. inhibiting control rod insertion when said control rod position signal reaches said control rod position setpoint.

14. The process as recited in claim 13 wherein the step of monitoring bulk reactor power and generating a signal indicative of said bulk reactor power includes the steps of:

a. monitoring the nuclear reactor neutron flux and generating therefrom a signal indicative of neutron flux power;

b. monitoring the nuclear reactor's coolant temperature upstream and downstream of the reactor core and generating therefrom a reactor power signal as a function of thermal energy added to the coolant; and c. auctioneering said signals indicative of neutron flux power and said power signal as a function of thermal energy added to the coolant and choosing the signal indicating a higher bulk reactor power.

* * * * *